United States Patent [19]
Carlson, Jr.

[11] 4,092,010
[45] May 30, 1978

[54] VARIABLE FLUID PASSAGE

[75] Inventor: William L. Carlson, Jr., St. Cloud, Minn.

[73] Assignee: General Signal Corporation, Rochester, N.Y.

[21] Appl. No.: 731,149

[22] Filed: Oct. 12, 1976

[51] Int. Cl.² .............................................. F16K 7/06
[52] U.S. Cl. .......................................... 251/4; 138/45; 239/265.43; 251/212
[58] Field of Search ........................................ 251/4–9, 251/212, 1 R, 1 A, 1 B; 138/45; 239/265.33, 265.37, 265.39, 265.43

[56] References Cited

U.S. PATENT DOCUMENTS

| | | | |
|---|---|---|---|
| 1,108,128 | 8/1914 | Buffum | 138/45 |
| 2,516,029 | 7/1950 | Swindin | 251/9 |
| 2,934,892 | 5/1960 | Hurlbert et al. | 239/265.39 |
| 2,985,420 | 5/1961 | Mylting | 251/8 |

FOREIGN PATENT DOCUMENTS

| | | | |
|---|---|---|---|
| 16,321 | 5/1909 | United Kingdom | 251/4 |
| 85,909 | 3/1936 | Sweden | 251/212 |

Primary Examiner—Martin P. Schwadron
Assistant Examiner—Richard Gerard
Attorney, Agent, or Firm—Harold Huberfeld; Jeffrey S. Mednick

[57] ABSTRACT

A device is provided having means for defining a fluid passage which include an inlet section, a throat section, and an outlet section. The fluid passage decreases in size in the inlet section and increases in size in the outlet section. A plurality of flexible members extend axially along the entire length of the fluid passage and extend radially outwardly from the means defining the fluid passage. Means are provided for adjusting the radial position of the flexible members to vary the size of the fluid passage.

25 Claims, 6 Drawing Figures ical fluid flow control, the
various devices, such as valves and orifices, which have
been utilized to control the flow of fluid, have generally
imposed a significant pressure drop on the system. At-
tempts have been made in the prior art to overcome
these problems. For example, in U.S. Pat. No. 2,434,835
to Colley a variable fluid passage is shown wherein a
flexible tubular lining is contained within a conduit
having outer and inner sections. A plurality of cables
are affixed to the outer conduit member and to the
flexible tubular lining at the center thereof. Rotation of
the outer conduit with respect to the inner conduit has
the effect of creating a venturi-shaped passage with a
tightened throat and a reduced diameter along substan-
tially the entire length of the passage. U.S. Pat. No.
2,560,634 to Colley shows another variable throat ven-
turi in which a flexible tubular member is compressed
and expanded by means of a plurality of motors driving
a plurality of studs into and out of the walls of the tubu-
lar member. Additionally, nozzles are known which
include variable restrictions. For example, U.S. Pat. No.
2,915,078 to Ochs, Jr., shows a variable nozzle restric-
tion wherein a flexible conduit is compressed along its
entire length by means of fluid pressure to vary the
nozzle restriction; and U.S. Pat. No. 2,934,892 to Hurl-
bert, et al., teaches the use of a variable propulsion
nozzle which utilizes a plurality of straps which are
twisted in a spiraling relationship to expand or contract
the area of the nozzle. These prior solutions have failed
to completely solve the pressure drop problem and
additionally have been rather complex, and therefore,
costly in nature.

SUMMARY OF THE INVENTION

Accordingly, the present invention provides a device
having means for defining a fluid passage which include
an inlet section, a throat section, and an outlet section.
The fluid passage decreases in size in the inlet section
and increases in size in the outlet section. A plurality of
flexible members extend axially along the entire length
of the fluid passage and extend radially outwardly from
the means defining the fluid passage. Means are pro-
vided for adjusting the radial position of the flexible
members to vary the size of the fluid passage.

OBJECTS OF THE INVENTION

Accordingly, an object of the present invention is the
provision of a device which will maximize the control
of fluid flow while producing a minimum pressure drop.

Another object of the present invention is the provi-
sion of a device for forming a variable fluid passage
which will closely approximate the shape of a classic
venturi tube at all flow permitting positions.

A further object of the present invention is the provi-
sion of a device for forming a variable fluid passage
which is relatively simple in construction, and there-
fore, inexpensive to manufacture.

Other objects, advantages, and novel features of the
present invention will become apparent from the fol-
lowing detailed description of the invention when con-
sidered in conjunction with the accompanying draw-
ings.

DESCRIPTION OF THE PREFERRED EMBODIMENT

Figure 1:
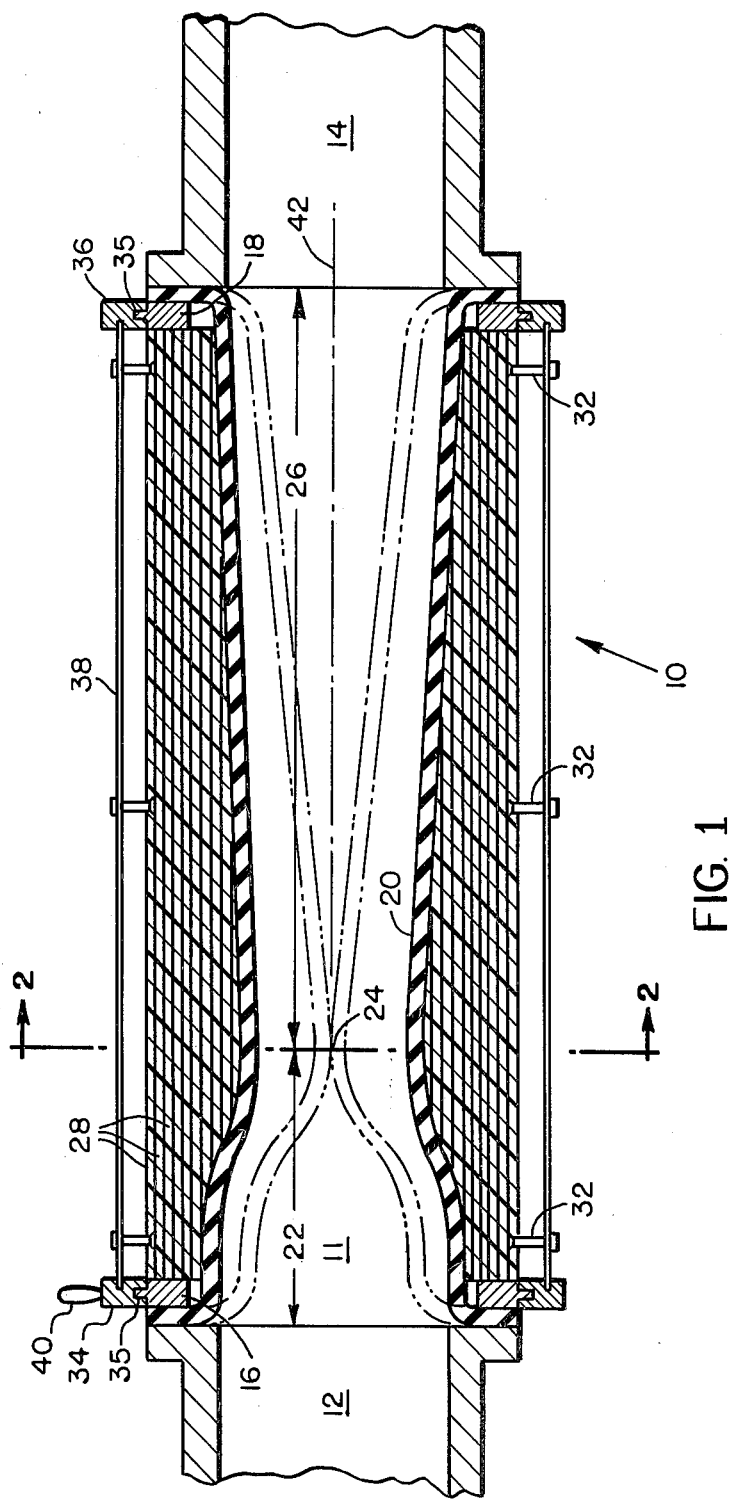
FIG. 1 shows a longitudinal cross-sectional view of a
first embodiment of the present invention.

The preferred embodiment of the present invention
will now be described in detail in connection with
FIGS. 1 through 4 of the drawings. In FIG. 1 a device
10 for forming a variable fluid passage 11 is mounted
between two sections of conduit 12 and 14, respec-
tively. The device 10 includes annular end members 16
and 18 which may be fastened to conduits 12 and 14,
respectively, by any suitable means, such as, bolts (not
shown). The device of the present invention preferably
includes a resilient elastomeric tube 20, which is se-
curely held in place, preferably, by positioning the end
portions of the tube 20 between the annular end mem-
bers 16 and 18 and the conduits 12 and 14, respectively.
The elastomeric tube 20 serves to define the fluid pas-
sage 11 and includes an inlet section 22, a throat section
24, and an outlet section 26. The diameter of the fluid
passage 10 gradually decreases in size in the inlet section
and gradually increases in size in the outlet section, to
form a tube which closely approximates the shape of a
classic venturi tube. The term classic venturi as used
herein is intended to encompass all venturi tubes includ-
ing Bardahl venturis.

Figure 2:
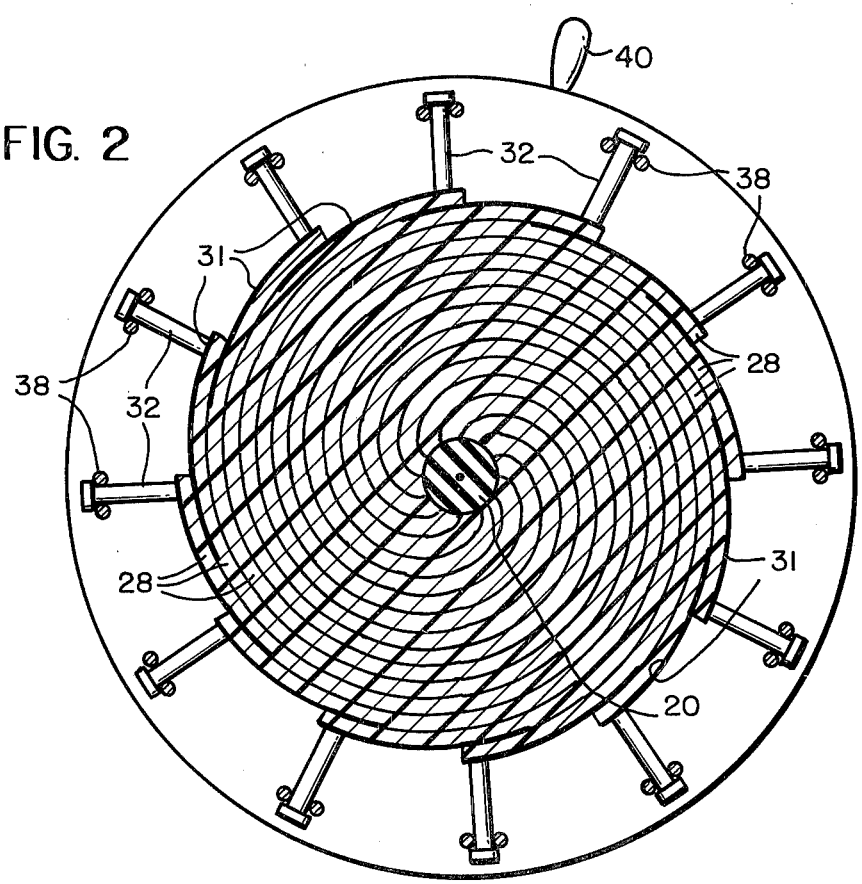
FIG. 2 shows a cross-sectional view of the device
along lines 2—2 in FIG. 1 when the fluid passage is in
the closed position.
Figure 3:
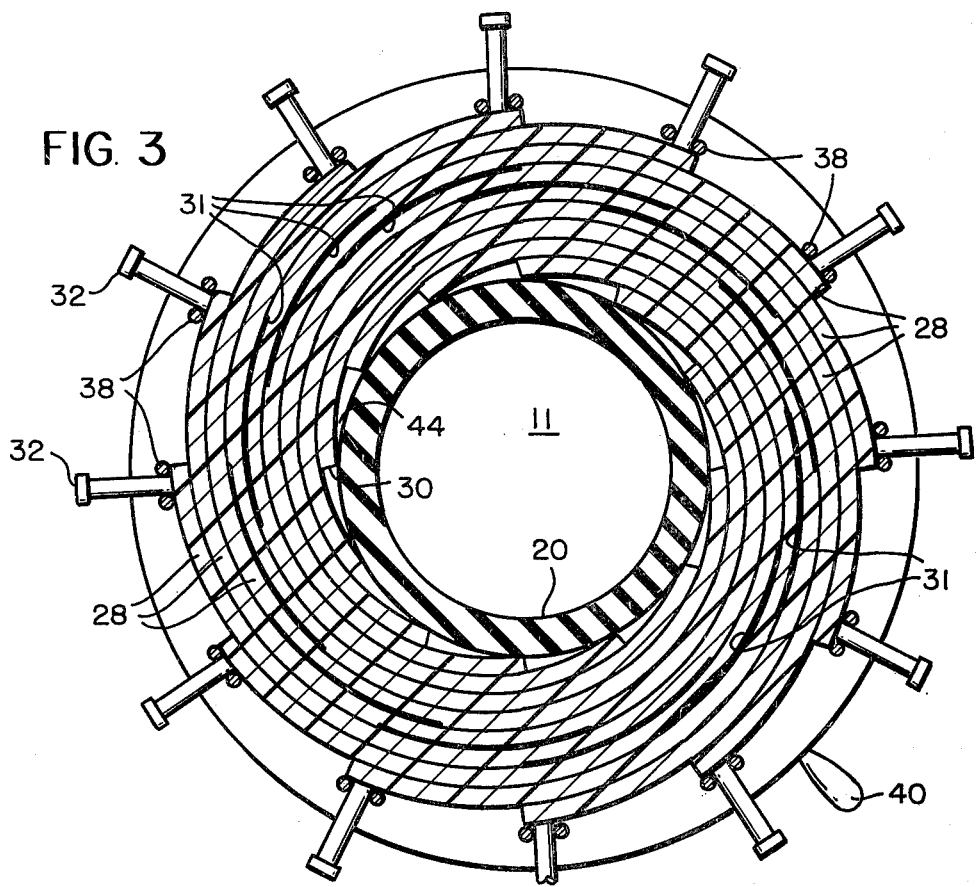
FIG. 3 shows a cross-sectional view of the device
along lines 2—2 in FIG. 1, when the fluid passage is in
the open position.
Figure 4:
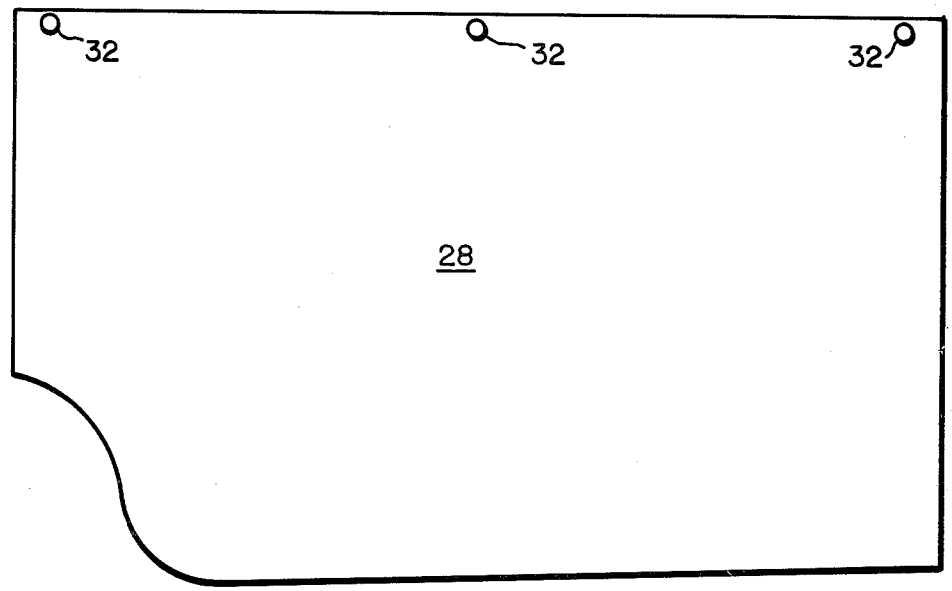
FIG. 4 shows a layout view of a single flexible ele-
ment ready to be installed in the device of the present
invention.

A plurality of flexible members 28 extend axially
along the entire length of the fluid passage and extend
radially outwardly from the elastomeric tube 20. As is
shown most clearly in FIG. 4, each of the flexible mem-
bers 28 has a sheet-like construction and has a radially
inner edge 30 having a non-linear contour. The flexible
members 28 are preferably made of polytetrafluoroeth-
ylene or any other material that is flexible, has a high
degree of lubricity, and does not compress easily. As is
best seen in FIGS. 2 and 3, the flexible members 28
extend radially outwardly from the elastomeric tube 20
in a spiral configuration. In the embodiment illustrated,
twelve flexible members 28 are shown, however, it is to
be understood that a greater or lesser number could be
utilized within the scope of the present invention.

As is shown in FIGS. 2 and 3, each of the flexible
members 28 overlaps with adjacent flexible members
29. In order to maintain the flexible members 28 in a
generally spiral path, means 31 for guiding the flexible
members are provided and are located between each of
the flexible members 28. The guide means 31 are prefer-
ably curved metal sheets which are connected between
the annular end sections 16 and 18. In the embodiment shown in FIGS. 1, 2, and 3, the guide means 31 are affixed to the annular end sections 16 and 18 by any suitable means, such as welding. Each of the flexible members 28 preferably travels along a path which is the involute of a regular polygon having a number of sides equal to the number of flexible members 28. Thus, in the embodiment illustrated, the flexible members 28 travel along a path which is the involute of a regular 12-sided polygon. Accordingly, the guides 31 are also contoured to follow the path of the involute of a 12-sided regular polygon, to thereby assure that the flexible members 28 will be maintained in this configuration.

Means are provided for adjusting the radial position of the flexible members 28 to vary the size of the fluid passage 11. This adjustment means includes a plurality of pins 32 affixed to each flexible member 28 near the radially outer edge thereof. The pins 32 may be stainless steel pins with flanged heads on both ends thereof. The lower end of each pin 32 is embedded in the flexible member 28.

A pair of rings 34 and 36 are connected to the annular end members 16 and 18, respectively, in such a manner as to permit relative rotational movement between the ring 34 and the end member 16 and the ring 36 and the end member 18. For example, annular bearing members 35 may be affixed to the end members 16 and 18. Rings 34 and 36 may then be assembled to rotate on the bearing members 35. The rings 34 and 36 are connected by a plurality of pairs of rods 38, which are equal in number to the number of flexible elements 28 and are equally spaced about the circumference of rings 34 and 36. Thus, in the embodiment shown, the pairs of rods 38 would be spaced 30° apart. The pins 32 are of such a length and the rods 38 are positioned radially at such a distance to insure that the rods 38 will always be capable of engaging the pins 32.

Either the ring 34 or the ring 36, or both, can be supplied with a suitable means for actuating the mechanism of the present invention. In the embodiment illustrated, the actuator consists of a handle 40 affixed to the ring 34. However, any suitable means capable of imparting rotational movement to the ring 34 would be suitable. For example, the ring 34 could be geared, and any number of motorized or automatic actuating means could be utilized.

In operation of the device of the present invention, an important feature is that the elastomeric tube 20 is maintained in a shape which closely approximates the shape of a classic venturi tube throughout the range of control of the passage. Thus, the inlet section 22 includes a fluid inlet and a fluid outlet with the fluid passage decreasing in cross-sectional area from the fluid inlet to the fluid outlet. Likewise, the outlet section 26 includes a fluid inlet and a fluid outlet with the fluid inlet of the outlet section 26 being attached to the fluid outlet of the inlet section 22 at the throat section 24. The fluid passage 10 increases in cross-sectional area from the fluid inlet to the fluid outlet of the outlet section 26.

In the operation of the device of the present invention, fluid will flow from conduit 12 through fluid passage 11 to conduit 14. Depending on the position of the handle 40, and correspondingly the flexible members 28, the elastomeric tube 20 will range in position from a fully opened position, as shown in FIGS. 1 and 3, to a fully closed position, as shown in phantom in FIG. 1 and as shown in FIG. 2. In order for the elastomeric tube 20 to achieve a fully closed position, and thereby permit the device of the present invention to be utilized as a valve, the wall thickness of the elastomeric tube 20 must be equal to the radius of the base circle of the base polygon of the involute along which the flexible members 28 travel. Assuming the variable fluid passage is in the fully opened position as shown in FIG. 3, if one moves the handle 40 in a counterclockwise direction, the rods 38 will engage the pins 32 forcing the ends 44 of flexible members 28 to impinge on the elastomeric tube 20 and compress it. If one continues to move the handle 40 in a counterclockwise direction, one will ultimately achieve the position shown in FIG. 2 wherein the flexible members 28 completely close the elastomeric tube 20 at the throat 24. It is interesting to note that because of the involute path of travel of the flexible members 28, when relatively little pressure is required to compress the elastomeric tube 20 during the initial stages of the closing process, the members 28 are nearly tangential to the surface of the tube 20. However, as the tube 20 becomes further compressed offering more resistance, the flexible members 28 become more and more perpendicular to the surface of the tube 20 making it easier to compress the tube. Of course, conversely, to open the fluid passage 11 from the position shown in FIG. 2, it is merely necessary to move the handle 40 in a clockwise direction. Because of the involute path of travel of the flexible members 28 and because of the non-linear contour of the edge 30, a venturi tube configuration is maintained throughout the operation of the apparatus of the present invention.

In certain applications it may be desirable for reasons of economy to dispense with the use of the elastomeric tube 20. In such instances, the fluid passage 11 will be defined by the inner portions 44 of the flexible member 28. The inner portion 44 is that portion of the flexible member 28 which is exposed to the passage 10 during the operation of the device. The inner portion 44 includes the edge 30 and will vary during the operation of the device from that portion shown in FIG. 3 to merely the edge 30 as shown in FIG. 2. Of course, in this embodiment, it may not be possible to completely close the passage 10 at the throat 24. In order to minimize this problem the flexible members 28 may be tapered along their radially inner edges. An alternative solution to this problem would be to make the radially inner portions 44 from a compressible material.

Figure 6:
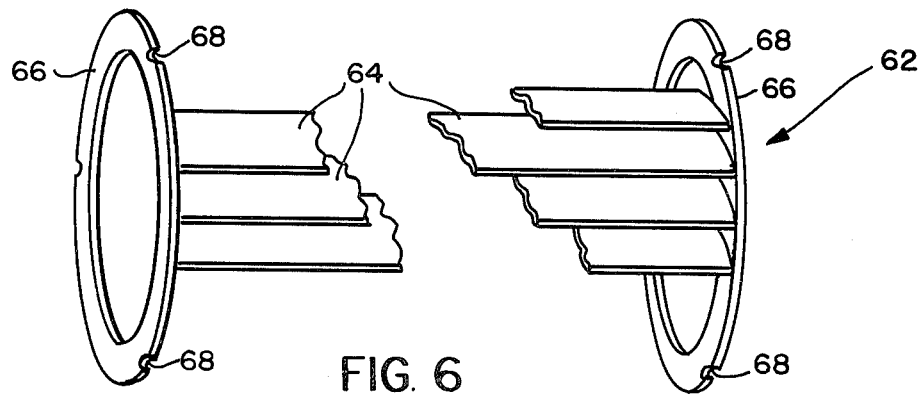
FIG. 6 shows a partial pictorial view of the guide
means in FIG. 5.
Figure 5:
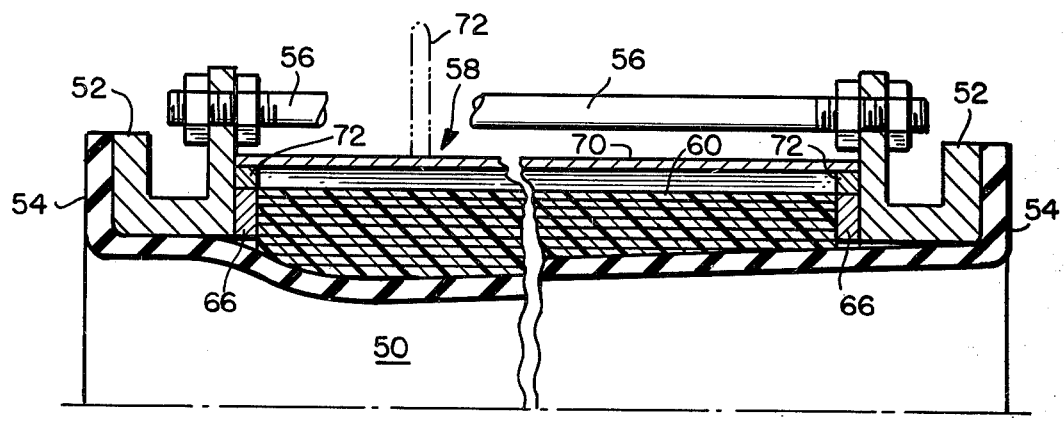
FIG. 5 shows a partial longitudinal cross-sectional
view of a second embodiment of the device of the pres-
ent invention.

FIGS. 5 and 6 illustrate a second embodiment of the device of the present invention in which the end structure and the means for adjusting the radial position of the flexible members are different than those illustrated in the FIG. 1 embodiment. In this embodiment the device for forming a variable fluid passage 50 is mounted between the two sections of conduit 12 and 14 by means of a pair of annular flanges 52 having a J-shaped cross-section. The flanges 52 may be fastened to conduits 12 and 14 by any suitable means, such as, bolts (not shown). An elastomeric tube 54 is securely held in place, preferably, by positioning the end portions of the tube 54 between the flanges 52 and the conduits 12 and 14, respectively. As in the embodiment shown in FIG. 1, the elastomeric tube 54 serves to define the fluid passage 50 and includes an inlet section, a throat section, and an outlet section.

A plurality of tie rod assemblies 56 serve to connect the flanges 52 and thereby contain an assembly 58 for varying the size of the fluid passage 50.

The assembly 58 includes a plurality of flexible sheet-like members 60 which extend radially outwardly in a spiral configuration from the elastomeric tube 54. The flexible members 60 are identical in structure to the flexible member 28, shown in FIG. 4, but do not include any pins along the radially outer edge. As in the embodiment shown in FIG. 1, the flexible members 60 extend radially outwardly along a path which is the involute of a regular polygon having a number of sides equal in number to the number of flexible members 60. To guide and maintain the flexible members 60 in the aforementioned involute path, a guide assembly 62, shown in FIG. 6, is provided including a plurality of guide sheets 64. The guide sheets 64 are located between each of the flexible members 60 are are contoured to be adjacent the involute path of travel of the flexible members 60. The guide sheets 64 are preferably curved metal sheets which are held in place by a pair of annular end pieces 66. The end pieces 66 are preferably annular metal rings which may be welded to the ends of the guide sheets 64. The end pieces 66 preferably include, along the radially outer edges thereof, a plurality of notches 68 to permit the end pieces 66 to be suitably fastened to the flanges 52. This may be accomplished by pinning, bolting, or any other suitable means.

The assembly 58 further includes a torque tube 70 which extends axially along substantially the entire length of the fluid passage 50 and surrounds the flexible members 60, the elastomeric tube 54, and the guide assembly 62. Furthermore, the torque tube 70 bears on the end pieces 66 in such a manner that it is free to rotate about the assembly 62. This may be most easily accomplished by affixing a pair of rings 72, made of a material having a low coefficient of friction, to the outer edges of the end pieces 66. In the alternative, the outer edges 66 may be coated with a low friction material. Thus, the torque tube 70 may bear on the rings 72. The term "torque tube," as used in this specification, is meant to include any generally cylindrical tube having sufficient wall rigidity to permit rotational motion to be imparted to the tube by some external means generally shown at 72. As in the example discussed in FIG. 1, the means 72 could be a handle, or any number of motorized or automatic actuating means.

Each of the flexible members 60 is securely affixed to the torque tube 70, preferably along its radially outer edge. This may be preferably accomplished by riveting the sheets 60 to the torque tube 70. Accordingly, in response to an input from the means 72, rotational motion will be imparted to the torque tube 70, and the size of the fluid passage 50 will be varied. Thus, in theory, the embodiment shown in FIGS. 5 and 6 works in an identical manner to the embodiment shown in FIG. 1.

As in the embodiment shown in FIG. 1, in the embodiment shown in FIGS. 5 and 6, it may not be necessary to utilize the elastomeric tube 54. In such instances, the fluid passage 50 will be defined by the inner portions of the flexible members 60.

Thus, a device has been provided for forming a variable fluid passage which will closely approximate the shape of a classic venturi tube at all flow permitting positions. Accordingly, this variable fluid passage will produce a minimum pressure drop at any flow permitting operating position. Furthermore, since the device of the present invention is relatively simple in construction, it is relatively inexpensive to manufacture.

While there have been described what are at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A device comprising:
   means for defining a fluid passage, said means including an inlet section, a throat section, and an outlet section, said fluid passage decreasing in size in said inlet section and increasing in size in said outlet section,
   a plurality of sheet-like flexible members extending axially along substantially the entire length of said fluid passage and extending radially outwardly in a spiral configuration from said means for defining a fluid passage, and
   means for adjusting the radial position of said flexible members to vary the size of said fluid passage.

2. A device as set forth in claim 1, wherein said means for defining a fluid passage extends about an axis, said inlet section having a fluid inlet and a fluid outlet with said fluid passage decreasing in cross-sectional area from said fluid inlet to said fluid outlet, said outlet section having a fluid inlet and a fluid outlet, said fluid inlet of said outlet section being attached to said fluid outlet of said inlet section at said throat section, said fluid passage in said outlet section increasing in cross-sectional area from its fluid inlet to its fluid outlet.

3. A device as set forth in claim 2, wherein said means for defining a fluid passage comprises an elastomeric tube.

4. A device as set forth in claim 3, wherein each of said flexible members overlaps other of said flexible members.

5. A device as set forth in claim 4, further including means for guiding said flexible members in a generally spiral path, said means being located between each of said flexible members.

6. A device as set forth in clam 4, wherein said means for adjusting the radial position of said flexible members comprises a handle means, a plurality of rods, and a plurality of pins, said pins being connected to said flexible members, said handle means being connected to said rods, said rods being arranged to engage said pins when said handle means is moved to vary the size of the fluid passage defined by the means for defining a fluid passage.

7. A device as set forth in claim 4, further including means for guiding said flexible members in a generally spiral path, said means being located between each of said flexible members, and wherein said means for adjusting the radial position of said flexible members comprises a handle means, a plurality of rods, and a plurality of pins, said pins being connected to said flexible members, said handle means being connected to said rods, said rods being arranged to engage said pins when said handle means is moved to vary the size of the fluid passage defined by the means for defining a fluid passage.

8. A device as set forth in claim 2, wherein each of said flexible members is sheet-like and extends radially outwardly in a spiral configuration, and wherein each of said flexible members has an inner portion, said inner portions forming said means for defining a fluid passage.

9. A device as set forth in claim 8, wherein each of said flexible members overlaps other of said flexible members.

10. A device as set forth in claim 9, further including means for guiding said flexible members in a generally spiral path, said means being located between each of said flexible members.

11. A device as set forth in claim 9, wherein said means for adjusting the radial position of said flexible members comprises a handle means, a plurality of rods, and a plurality of pins, said pins being connected to said flexible members, said handle means being connected to said rods, said rods being arranged to engage said pins when said handle means is moved to vary the size of the fluid passage defined by the means for defining a fluid passage.

12. A device as set forth in claim 9, further including means for guiding said flexible members in a generally spiral path, said means being located between each of said flexible members, and wherein said means for adjusting the radial position of said flexible members comprises a handle means, a plurality of rods, and a plurality of pins, said pins being connected to said flexible members, said handle means being connected to said rods, said rods being arranged to engage said pins when said handle means is moved to vary the size of the fluid passage defined by the means for defining a fluid passage.

13. A device as set forth in claim 2, wherein each of said flexible members is sheet-like and extends radially outwardly in a spiral configuration and wherein each of said flexible members includes a radially inner edge, said inner edge having a nonlinear contour.

14. A device as set forth in claim 13, wherein each of said flexible members includes an inner portion which is bordered on one side by said inner edge and wherein all of said inner portions define a fluid passage which closely approximates the shape of a venturi tube.

15. A device as set forth in claim 2, wherein each of said flexible members is sheet-like and extends radially outwardly along a path which is the involute of a regular polygon.

16. A device as set forth in claim 15, wherein said means for defining a fluid passage comprises an elastomeric tube having a wall thickness equal to the radius of the base circle of said regular polygon.

17. A device as set forth in claim 2, wherein:
 (a) each of said flexible members is sheet-like and extends radially outwardly in a spiral configuration;
 (b) said means for defining a fluid passage comprises an elastomeric tube;
 (c) each of said flexible members overlaps other of said flexible members; and
 (d) said means for adjusting the radial position of said flexible members comprises a torque tube extending axially along substantially the entire length of said fluid passage, surrounding said elastomeric tube and said flexible members and adapted to rotate thereabout, each of said flexible members being securely affixed to said torque tube, and means for imparting rotational motion to said torque tube to vary the size of the fluid passage defined by said elastomeric tube.

18. A device as set forth in claim 17, further including means for guiding said flexible members in a generally spiral path, said means being located between each of said flexible members.

19. A device as set forth in claim 18, wherein each of said flexible members extends radially outwardly along a path which is the involute of a regular polygon.

20. A device as set forth in claim 19, wherein said means for guiding said flexible members comprises a plurality of guide sheets, one of which is located between each of said flexible members, said guide sheets being contoured to be adjacent said involute paths.

21. A device as set forth in claim 19, wherein said means for defining a fluid passage comprises an elastomeric tube having a wall thickness equal to the radius of the base circle of said regular polygon.

22. A device as set forth in claim 2, wherein:
 (a) each of said flexible members is sheet-like and extends radially outwardly in a spiral configuration;
 (b) each of said flexible members has an inner portion, said inner portions forming said means for defining a fluid passage;
 (c) each of said flexible members overlaps other of said flexible members; and
 (d) said means for adjusting the radial position of said flexible members comprises a torque tube extending axially along substantially the entire length of said fluid passage, surrounding said flexible members and adapted to rotate thereabout, each of said flexible members being securely affixed to said torque tube, and means for imparting rotational motion to said torque tube to vary the size of the fluid passage defined by said inner portions of said flexible members.

23. A device as set forth in claim 22, further including means for guiding said flexible members in a generally spiral path, said means being located between each of said flexible members.

24. A device as set forth in claim 23, wherein said means for guiding said flexible members comprises a plurality of guide sheets, one of which is located between each of said flexible members, said guide sheets being contoured to be adjacent said involute paths.

25. A device as set forth in claim 24, wherein said means for defining a fluid passage comprises an elastomeric tube having a wall thickness equal to the radius of the base circle of said regular polygon.

* * * * *